United States Patent [19]

Davis

[11] Patent Number: 5,121,503
[45] Date of Patent: Jun. 9, 1992

[54] SATELLITE SIGNALING SYSTEM HAVING A SIGNAL BEAM WITH A VARIABLE BEAM AREA

[75] Inventor: Walter L. Davis, Coral Springs, Fla.
[73] Assignee: Motorola, Inc., Schaumburg, Ill.
[21] Appl. No.: 759,761
[22] Filed: Sep. 13, 1991

Related U.S. Application Data

[63] Continuation of Ser. No. 432,268, Nov. 6, 1989, abandoned.

[51] Int. Cl.[5] .................... H04B 7/185; G08B 5/22
[52] U.S. Cl. .................... 455/12.1; 340/825.44; 342/356
[58] Field of Search .......... 455/12, 13, 33; 342/350, 354, 355, 356; 340/825.44; 343/DIG. 2

[56] References Cited

U.S. PATENT DOCUMENTS

| | | | |
|---|---|---|---|
| 3,772,475 | 11/1973 | Loffreda | 455/12 |
| 3,836,721 | 9/1974 | Sugioka | 455/12 |
| 4,145,658 | 3/1979 | Acampora et al. | 455/12 |
| 4,268,831 | 5/1981 | Valentino et al. | 342/376 |
| 4,330,857 | 5/1982 | Alverez, III et al. | 455/12 |
| 4,489,325 | 12/1984 | Bauck et al. | 342/376 |
| 4,518,916 | 5/1985 | Davis et al. | 340/825.44 |
| 4,595,926 | 6/1986 | Kobu et al. | 342/368 |
| 4,628,506 | 12/1986 | Sperlich | 455/12 |
| 4,682,165 | 7/1987 | Davis | 455/33 |
| 4,689,625 | 8/1987 | Barmat | 342/356 |
| 4,816,820 | 3/1989 | Davis | 340/825.44 |

OTHER PUBLICATIONS

Proceeding of the 8th European Microwave Conference, Paris France, (Sep. 4–8, 1978), D. O. Reudink et al., "A High-Capacity Satellite Utilizing Fixed and Scanning Spot Antenna Beams".

*Primary Examiner*—Reinhard J. Eisenzopf
*Assistant Examiner*—Lisa Charouel
*Attorney, Agent, or Firm*—Daniel R. Collopy; Vincent B. Ingrassia; William E. Koch

[57] ABSTRACT

This invention relates to a satellite signalling system, such as a satellite paging system, having signal coverage over a very wide area. The satellite signalling system comprises a satellite to which is coupled an antenna for providing a signal beam having a variable beam area. The satellite can control the position of the antenna such that the signal beam can be directed in a predetermined sequence to a plurality of locations on earth. The antenna is arranged to vary the signal beam's area in dependence on the location to which the signal beam is directed. The signal beam comprises a data signal having a data rate which can be varied by the antenna in dependence on the beam area.

12 Claims, 9 Drawing Sheets

SATELLITE SIGNALING SYSTEM HAVING A SIGNAL BEAM WITH A VARIABLE BEAM AREA

This is a continuation of application Ser. No. 07/432,268, filed Nov. 6, 1989, now abandoned.

FIELD OF THE INVENTION

This invention relates to satellite signalling systems having signal coverage over a very wide area. The present invention is particularly, though not exclusively, concerned with a satellite signalling system such as may be used in a satellite paging system.

This invention is related to U.S. patent application No. 431,806, filed Nov. 6, 1989, entitled "Satellite Signalling System", filed on even date herewith and assigned to the assignee of the present invention.

BACKGROUND OF THE INVENTION

The present state-of-the-art satellite paging systems comprise a fixed position antenna mounted on a satellite in synchronous orbit. Typically in such systems, the antenna is fixed so that the spot or the "footprint" of the signal beam covers the portion of the globe which is "visible" to the satellite; that is, approximately one-third of the earth's surface.

The ground level strength of the signal transmitted by the antenna in these prior art systems is fairly uniform across the covered area; however, the signal strength is very weak. This creates a problem, even for the highest powered synchronous satellites, since the ground level signal is too weak to allow for in-building paging coverage. For example, for a synchronous satellite with a radiated power of 400 watts, a state-of-the-art selective call paging receiver using the POCSAG paging protocol at a bit rate of 512 bits per second has been observed to have only 2 dB of signalling margin. That is, the average signal strength on the ground is only 2 dB above the minimum level required to activate a paging device. Thus, considering that most buildings attenuate RF paging signals by 20 dB, these systems could not be used to signal paging users inside buildings.

One solution to the problems with the current system would be to reduce the bandwidth of the paging receiver by lowering the data rate to 60 baud or less. However, this makes the paging system extremely expensive and impractical in view of the small number of users that can be serviced by the paging system. That is, the low bit rate could only support a small volume of paging traffic.

The co-pending U.S. patent application mentioned previously provides a significant advancement over the current art in that it describes a satellite paging system that uses an antenna with a smaller "footprint" or beamwidth to achieve significantly higher ground level signal strengths, and the antenna beam is steered to cover different geographical areas in a repetitive pattern to achieve wide area coverage. The combination of the resultant higher ground level signal strength, the scanning motion of the beam over the surface of the earth, and a pager battery saver technique that turns the paging receivers ON and OFF in synchronism with the scanning movement of the beam, allows a signalling data rate of either 512 baud or 1200 baud to be used and offers the first practical approach for implementing a very wide area or global satellite based paging system.

However, even the improved system described in the copending application has several limitations. First of all, even the 512 baud or 1200 baud signalling rate it can achieve is not high enough to support the very large number of users that can be expected to eventually want global paging service. Secondly, the system can only handle regional population differences by varying the length of time the scanning beam is positioned to cover a given region. Finally, the system has no way of taking advantage of the fact that most of the population of the developed countries resides in densely populated cities.

Thus, it is an object of the present invention to provide an improved satellite signalling system with greater message throughput.

It is another object of the invention to provide a satellite signalling system that can accommodate regional differences in population density.

It is yet another object of the invention to provide a satellite signalling system that can selectively support a higher data signalling rate.

It is still another object of the invention to provide a satellite signalling system that can support a sufficient number of users as to render the system economically viable.

SUMMARY OF THE INVENTION

In accordance with the present invention, there is provided a satellite signalling system comprising a satellite and an antenna which is coupled to the satellite for providing a signal beam having a variable position and beam area. The satellite can control the position of the antenna such that the signal beam can be directed in a predetermined sequence to a plurality of locations on earth. The antenna is arranged to vary the signal beam's area in dependence on the location to which the signal beam is directed. The signal beam comprises a data signal having a data rate which can be varied by the system in dependence on the beam area, for example, if the signal beam is directed at a location having a dense population, the antenna varies the beam area and data rate to provide a small beam area and a data signal having a high data rate. If the signal beam is directed at a location having a sparse population, the antenna varies the beam area and data rate to provide a large beam area and a data signal having a low data rate.

Thus, it will be appreciated that by having a movable antenna which transmits a signal beam having a variable beam area and a variable data rate, the beam area and data rate can be varied for each of the specific locations so that the signal strength at the ground level for each location is sufficient to allow for in-building paging coverage. The data rate is varied so as to maximize the throughput of the signalling system.

It will also be appreciated that since the antenna is arranged to be movable in a predetermined sequence, the signal beam can be sequentially directed at specific geographical areas which as a result enables the antenna to scan a very wide area and so provide continental or global coverage.

A satellite signalling system in accordance with the present invention will now be described by way of example only with reference to the accompanying drawings.

DETAILED DESCRIPTION OF THE PREFERRED EMBODIMENT

Figure 1:
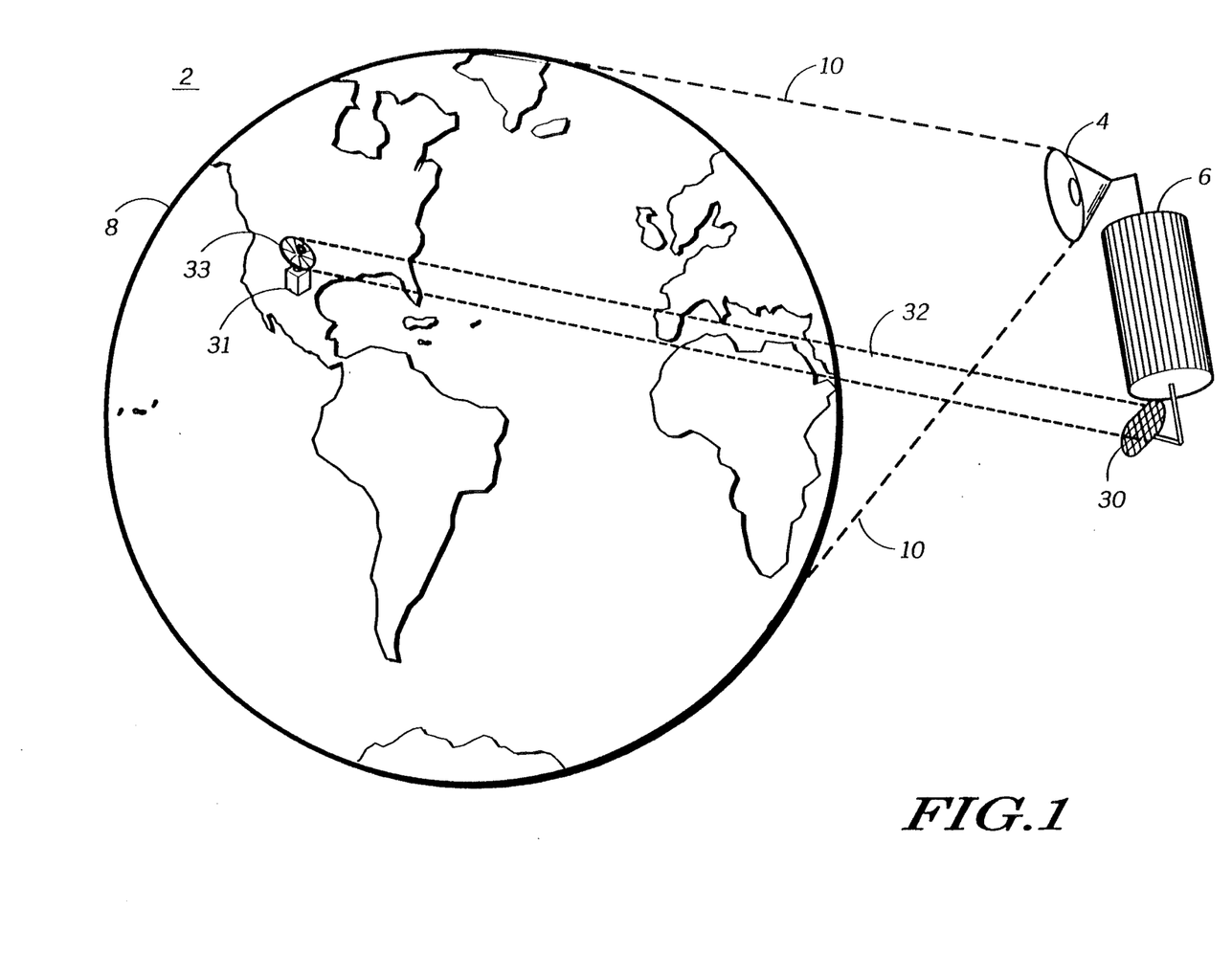
FIG. 1 is a diagram of a prior art satellite paging system.

Referring firstly to FIG. 1, the prior art satellite paging system 2 comprises a fixed antenna 4 mounted on a satellite 6 in synchronous orbit around the earth 8. The operation of the antenna 4 is controlled by the satellite 6.

The antenna 4 is arranged so that the signal beam 10 (whose periphery is represented by the dotted lines in FIG. 1) transmitted from the antenna 4 has a beam area which covers the portion of the earth's surface which is "visible" to the satellite 4.

As has been stated above, the satellite paging system 2 cannot provide in-building paging coverage unless the data rate of the signal beam 10 is reduced to 60 baud or less since the signal strength at the earth's surface is very weak.

Figure 2:
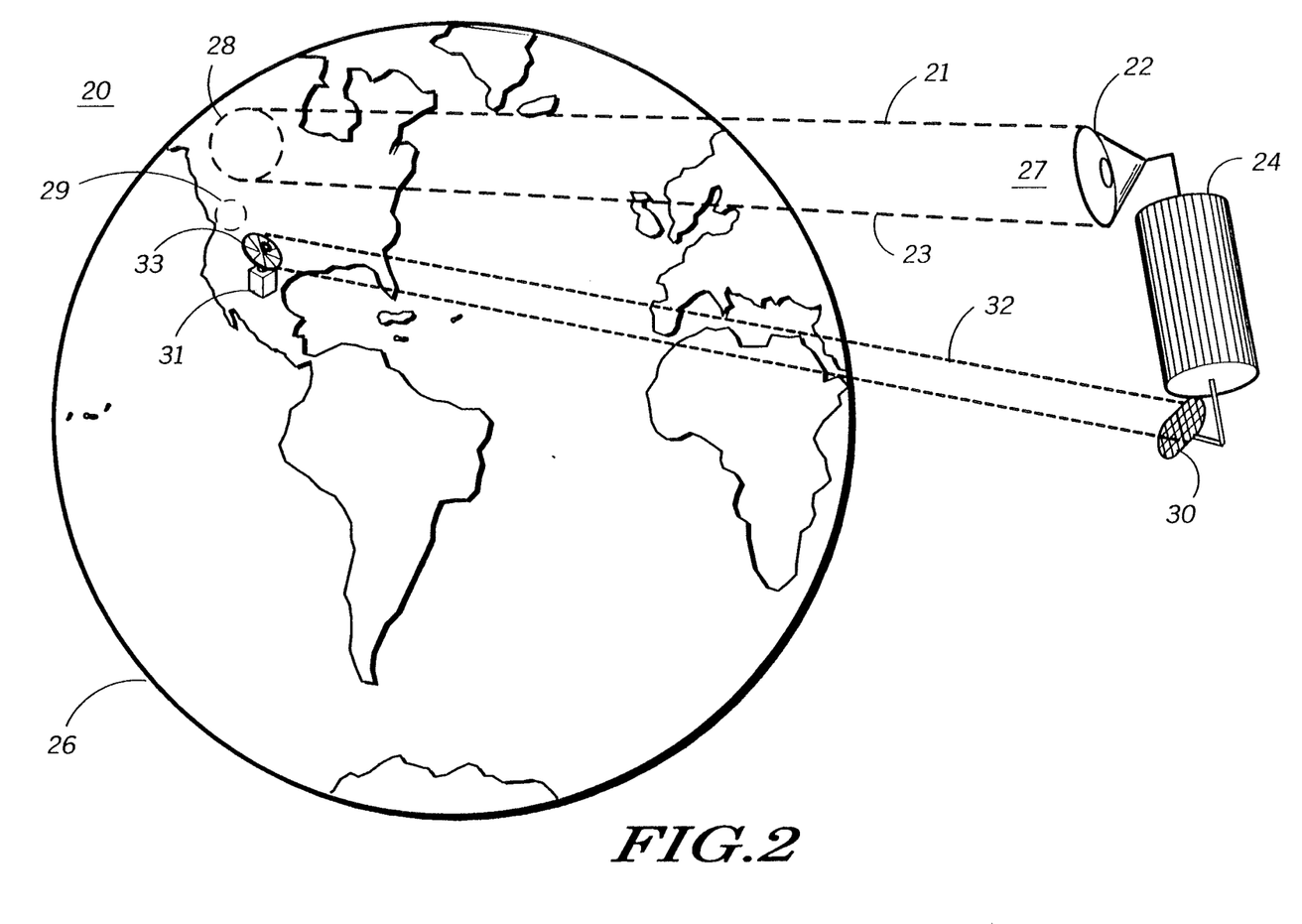
FIG. 2 is a diagram of a satellite paging system in accordance with the present invention.

Referring now also to FIG. 2, in order to circumvent these problems, a satellite paging system 20, according to the preferred embodiment of the present invention, comprises a steerable or movable antenna 22 mounted on a satellite 24 in synchronous orbit around the earth 26. The movement and operation of the movable antenna 22 is controlled by the satellite 24.

The movable antenna 22 can be moved by the satellite 24 so that the transmitted signal beam 27 (represented by the dotted lines 21 and 23 in FIG. 2) can be directed towards specific geographical locations on the earth's surface and thus the satellite 24 can scan the whole portion of the earth's surface which is "visible" to the satellite 24. The movable antenna 22 sequentially scans each of the geographical locations in a predetermined sequence and for a predetermined time.

The movable antenna 22 is arranged so that the transmitted signal beam 27 (represented by the dotted lines in FIG. 2) has a variable beam area 28 and signal data rate which can be varied with the beam area 28. As the movable antenna 22 scans each of the geographical locations, the satellite 24 selects the optimum beam area and the corresponding signal data rate to maximize the throughput of the paging system 20 and to provide sufficient signal strength at the earth's surface for each location to allow for in-building paging coverage. The beam area and the bit rate of the down-link signal for each beam position are selected using the relationships that the ground level signal strength varies inversely with the beam area, while the ground level signal strength required for reliable communications in buildings varies directly as the bit rate. Thus, for densely populated urban areas, the beam area 28 would be reduced to the area needed to cover the city while the data rate would be increased to the maximum value that would allow for reliable signal reception inside the city's tall buildings. Conversely, in sparsely populated rural areas, the beam area 28 would be enlarged and the signal data rate reduced to allow for reliable paging coverage over a very large area.

For example, for a satellite paging system with 400 watts of effective radiation power (ERP), a beam diameter of 800 miles would give a ground level signal strength that is 20 dB above the paging threshold for a signal data rate of 600 baud which is sufficient to provide good in-building coverage in a large, sparsely populated rural area. Since the ground level signal strength varies as approximately the second power of the diameter of the beam, reducing the diameter by a factor of four from 800 miles to 200 miles would allow the signalling data rate to be increased to 9600 baud while maintaining the same signal strength margin needed to insure good in-building paging service in densely populated urban areas.

Figure 3:
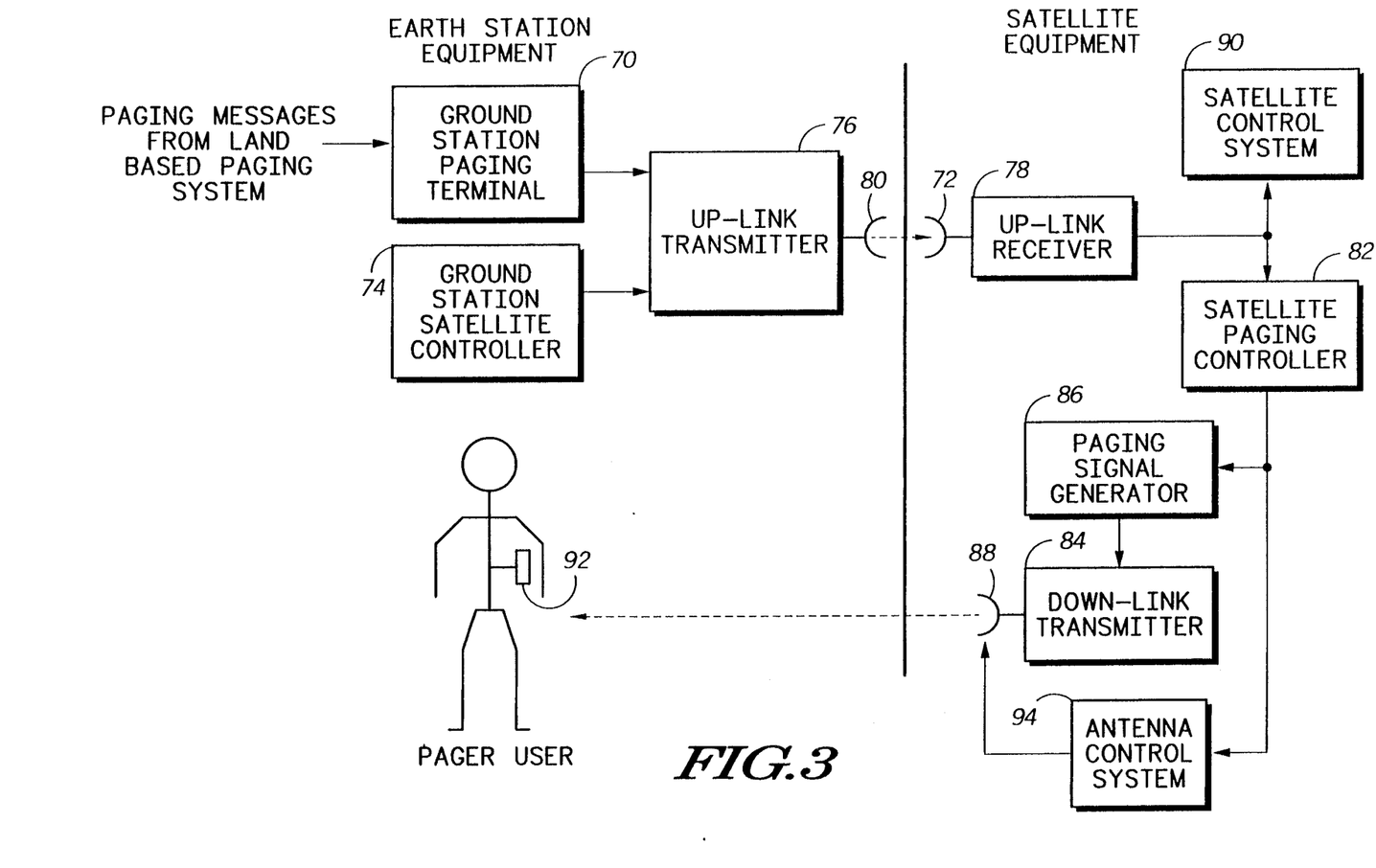
FIG. 3 is a block diagram of the system that comprises the present invention.

The satellite paging system 20, according to the present invention, operates in the following manner. Referring to FIG. 3, paging messages from a number of land based paging system terminals are directed to a ground base terminal 70 over the public telephone network, or some other communications network. The terminal 70 processes the incoming messages, and the resultant output paging signals, together with the control signals from a ground station satellite controller 74, are applied to an up-link transmitter 76 that transmits them to the satellite 24 using well-known optical or radio communications techniques. Up-link signals, consisting of paging data signals and signals required to control the operation of a satellite which in turn control the operation of movable antenna 72, are transmitted from up-link transmitter 76 to up-link receiver 78 via transmitting antenna 80 and receiving antenna 72. Transmitted up-link signals consist of paging data signals and signals required to control the operation of the satellite which in turn controls the operation of movable or steerable antenna 72. It should be appreciated that up-link data can be transmitted at a much higher data rate than that used for down-link transmissions.

Movable antenna 88 is directed by an antenna control system 94 coupled to satellite paging controller 82 to scan specific geographic locations on the earth's surface in a predetermined sequence and for a predetermined time. When the beam of movable antenna 88 is directed at a particular location, down-link transmitter 86 will transmit paging signals in the batch form previously described and corresponding to the specific location during the time slot assigned to that location via paging signal generator 84.

In operation, the satellite 24 scans the surface of the earth 26 by directing the movable antenna 88 towards specific geographical locations on the earth's surface in a predetermined sequence and for a predetermined time. When the movable antenna 88 is directed at a particular location, the beam area 28 and the signal data rate are adjusted to the values that correspond to the particular location. The satellite 24 then transmits the paging signals in the batch that corresponds to the specific location during the time slot assigned to that location.

Figure 4:
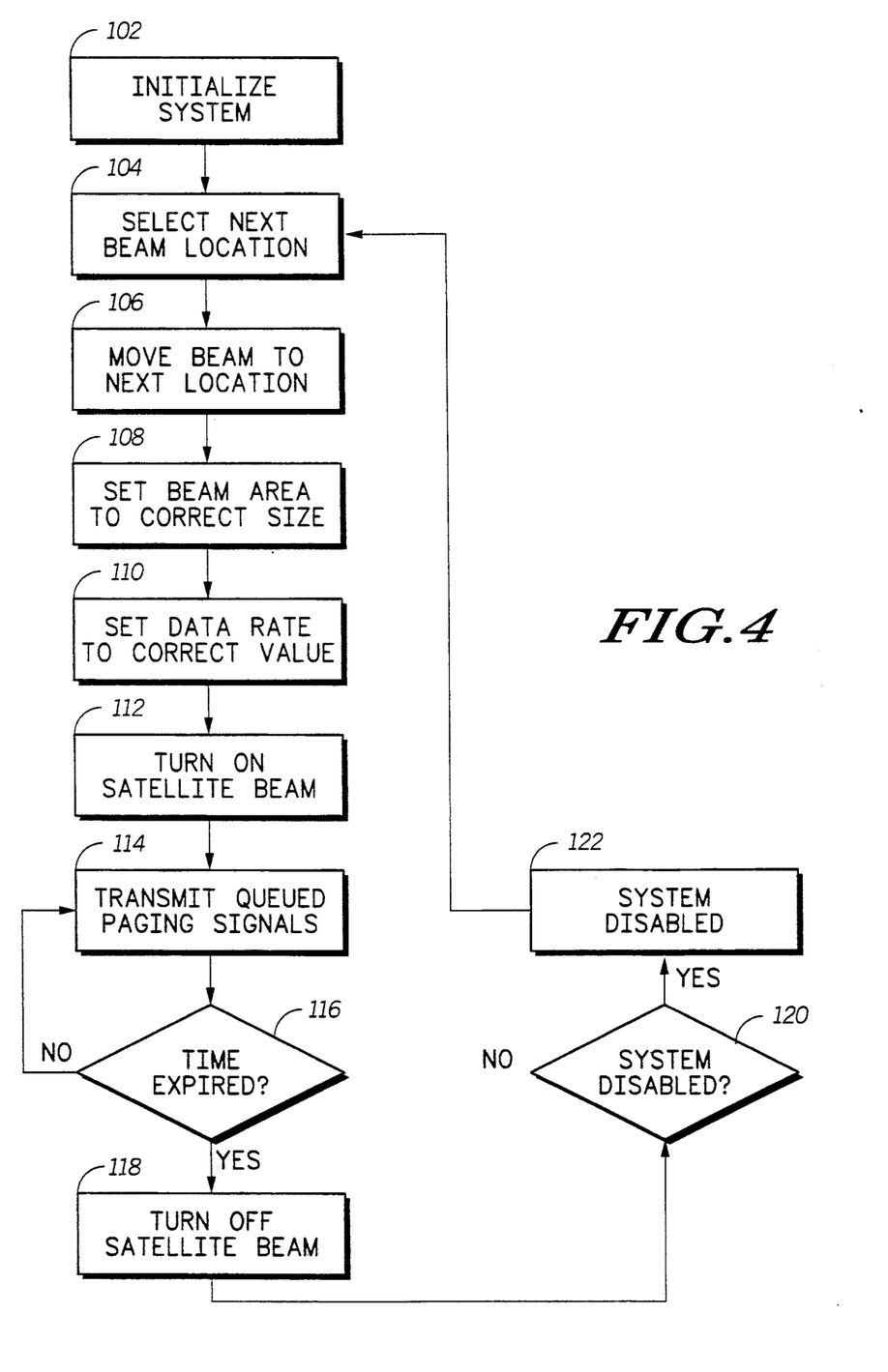
FIG. 4 is a flow chart that details the operation of the system shown in FIG. 3.

The control logic for operation of the satellite paging controller 82 of FIG. 2 is illustrated in the flow chart of FIG. 4.

The satellite paging system 20 is enabled (block 102), and the next geographical location is selected (block 104). The antenna 22 is moved so that the signal beam is directed at the next geographical location (block 104). The beam area 28 is adjusted to the value that corresponds to this next geographical location at 108, and the signal data rate is adjusted to the value that corresponds to this next geographical location at 110. After these values are set, the signal beam 27 is turned on (block 112), and the paging signals are transmitted at 114. The paging signals are transmitted for a predetermined time slot, and if the time slot has expired, then the routine branches to turn off the signal beam 27 (block 118). If the satellite paging system is to be disabled, the routine is ended at block 122. If no disabling signal is detected at block 120, the routine returns to block 104 to select the next geographical location whereby the routine starts again.

Figure 5A:
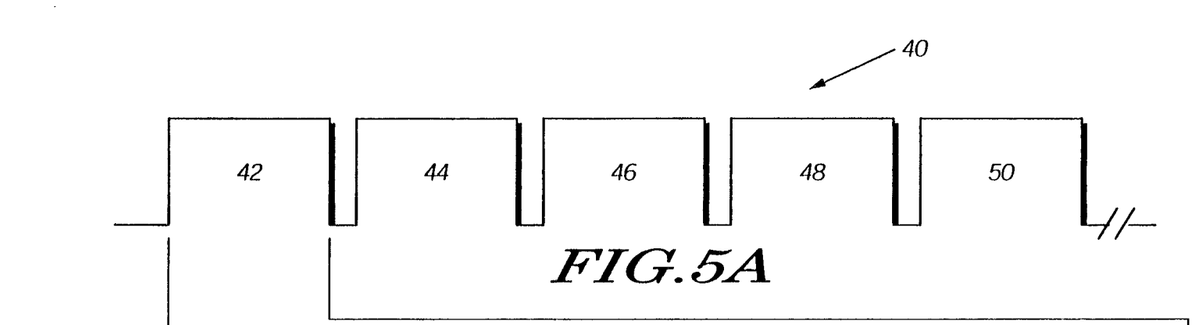
FIG. 5A is a diagrammatic representation of the sequence of batches of a transmitted down-link signal in accordance with the present invention.

FIG. 5A shows an exemplary representation 40 of one of the signals transmitted from the satellite antenna 22. The signal 40 is a time-division multiplexed binary paging signal and comprises a sequence of batches 42–50. Each of the batches 42–50 corresponds to a specific geographical location within the scanning area covered by the satellite 24. For example, batch 42 may correspond to New York, batch 44 Boston, batch 46 Chicago, etc. Each batch is transmitted to the appropriate location on a sequential basis. For purposes of example, the POCSAG signalling protocol is used for the signalling format in each batch.

Figure 5B:
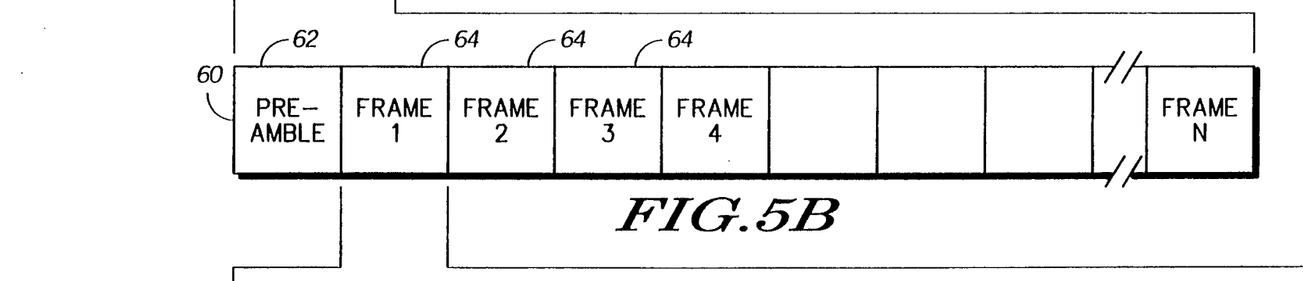
FIG. 5B is a diagrammatic representation of a signal batch which forms part of the sequence shown in FIG. 5A.

FIG. 5B illustrates that each batch (e.g., 42) comprises a preamble 62 followed by N frames 64.

Figure 5C:
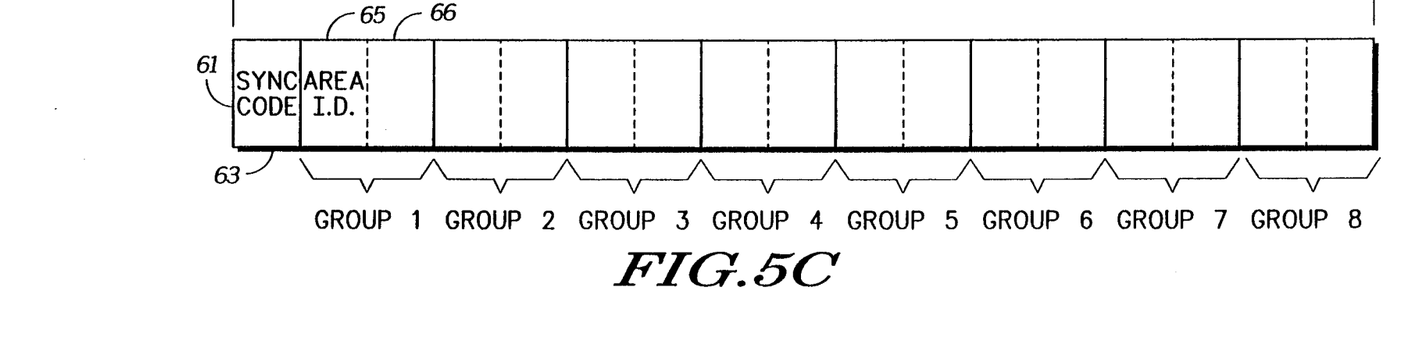
FIG. 5C is a diagrammatic representation of a signal frame that forms part of the batch shown in FIG. 5B.

Finally, FIG. 5C shows an exemplary representation 61 of one of the frames in FIG. 5A. The frame 61 comprises a synchronization code 63 followed by a unique area identification code 65 that corresponds to the geographical location covered by the batch transmission. The identification code 65 is followed by address signals 66 for addressing a predetermined pager.

The format of the frame 61 enables the operation of the battery savers in the pagers to be synchronized to the scanning sequence of the movable antenna 24 by using the synchronization code 63. A pager operating within a particular geographical location, once it has been synchronized, will only be powered up in order to decode paging signals if the satellite 24 is transmitting to its geographical location. This provides for good pager battery life.

In addition, the identification code 65 of the frame 61 identifies the current operating location to the pager. Thus, if the pager is outside its normal operating area, the identification code 65 provides the pager with location information which can be displayed on a display or can be used to enable different operating modes of the pager, for example, the "roaming" mode.

The pagers in the paging system operate to synchronize their battery savers to the appropriate batch in the signal transmissions from the satellite using the synchronization code 62 of the appropriate batch signal. Once a pager has been synchronized, it will decode the appropriate paging signals.

Figure 6:
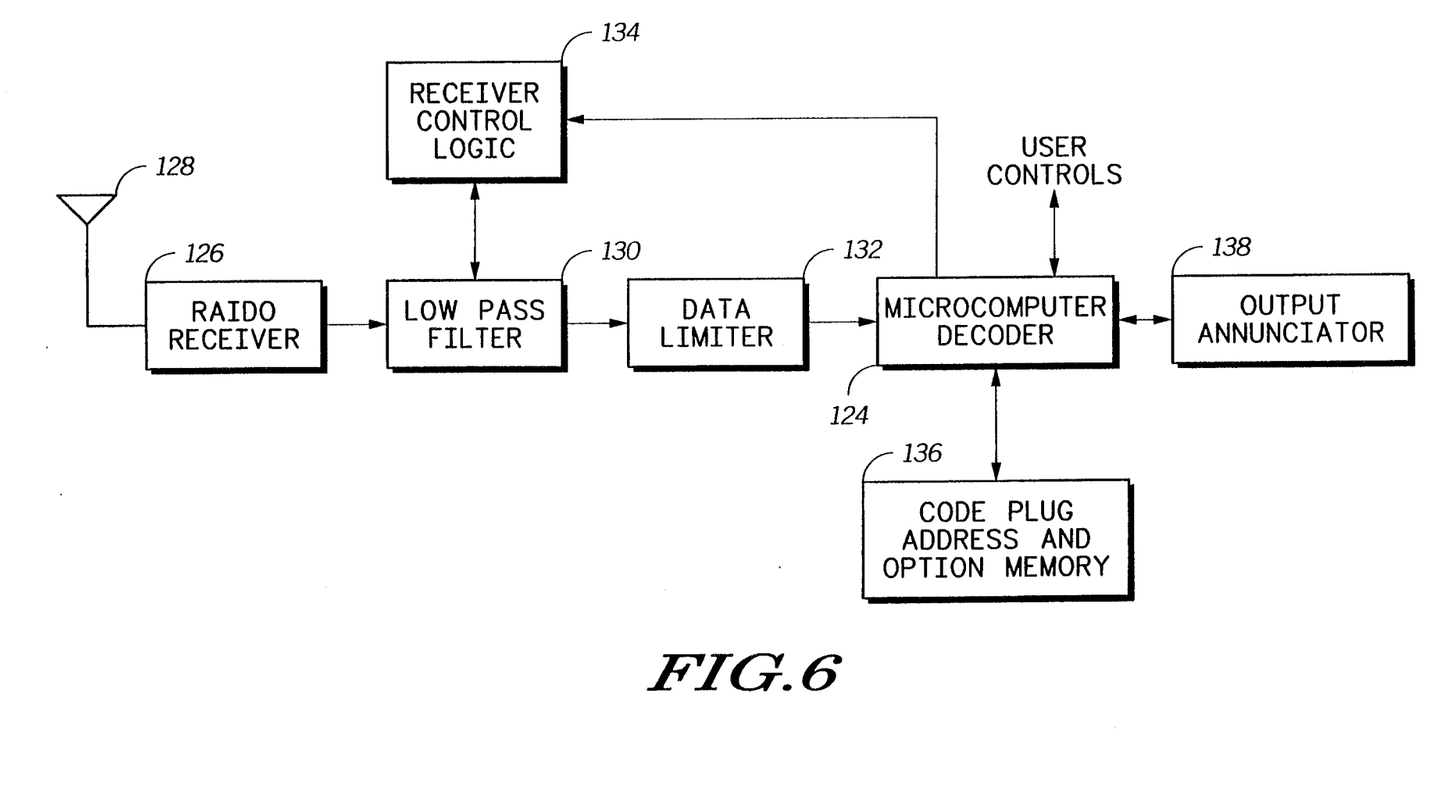
FIG. 6 is a block diagram of a paging receiver of the type that could be used in the new satellite signalling system.
Figure 7A:
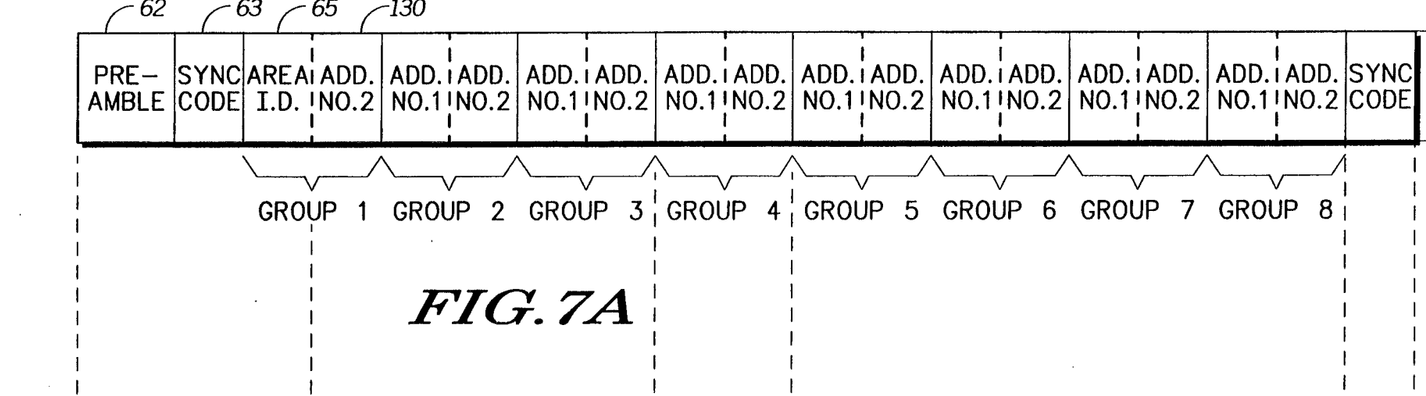
FIGS. 7A and FIG. 7B is a timing diagram that details the operation of the battery saver circuit of the pager shown in FIG. 6.
Figure 7B:
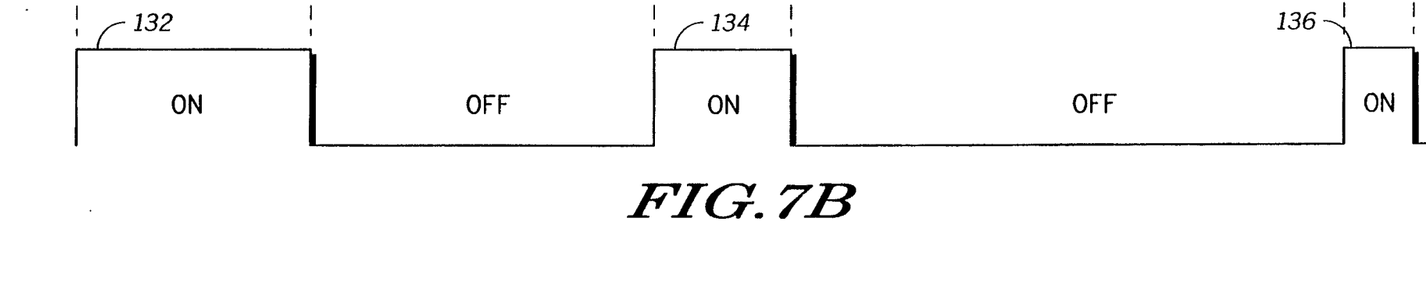
Figure 8A:
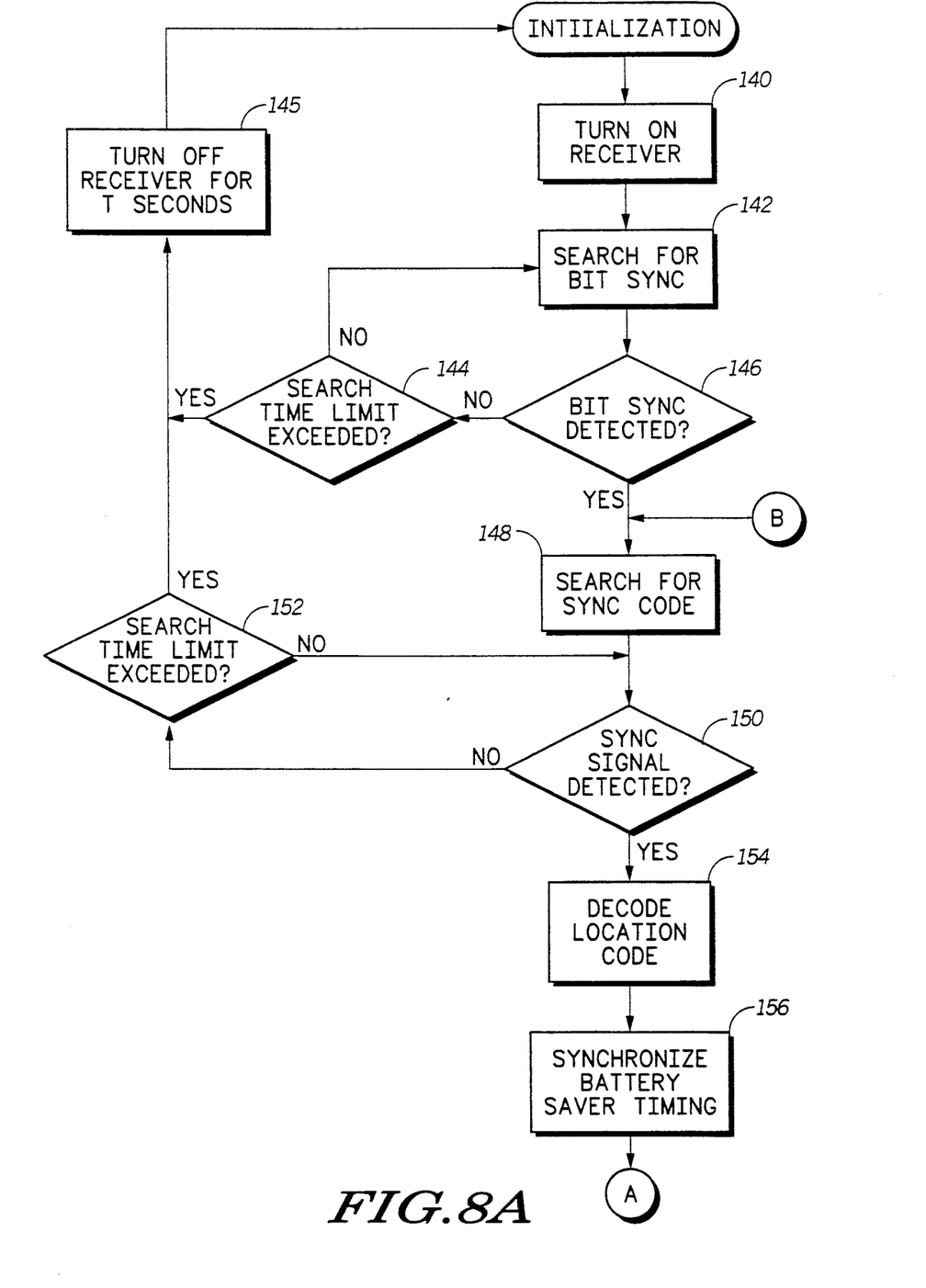
FIGS. 8A and 8B show a flow chart detailing the operation of the decoder of the pager shown in FIG. 6.
Figure 8B:
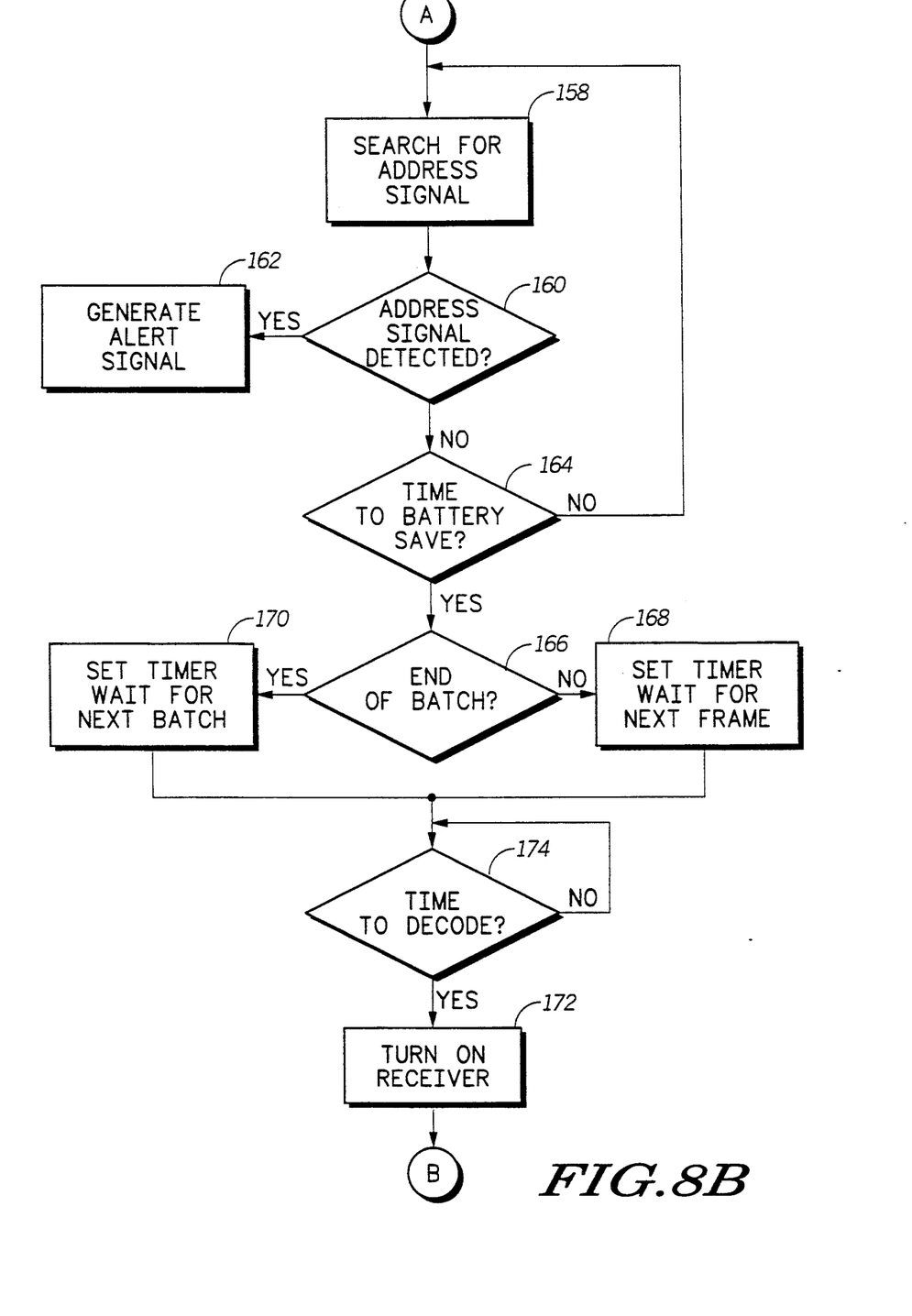

The details of the operation of the paging receivers in the new satellite system is best described in conjunction with FIGS. 6, 7, and 8.

FIG. 6 is a block diagram of a paging receiver that is appropriate for use in the satellite paging system. With one exception, it is a conventional selective call paging receiver that is well known in the art. The exception is that the signalling rate and detection bandwidth of the receiver is dependent on the location of the receiver. These parameters can be set either by manufacturing a different pager for each location in the satellite system, or by making these parameters variable via information stored in the code plug. The details of how to build a pager with a variable bit rate and decoding bandwidth are fully described in U.S. Pat. No. 4,816,820 entitled "Radio Communication Receiver with Apparatus for Altering the Bit Rate of the Receiver" by Davis and assigned to the assignee of the present invention.

The receiver shown in FIG. 6 uses a microprocessor base decoder 124 which is programmed to decode the signalling protocol shown in FIGS. 5A, 5B, and 5C. The operation of this type of decoder is described in U.S. Pat. No. 4,518,961 entitled "Universal Paging Device With Power Conservation" by Davis et al, which is assigned to the assignee of the present invention. A radio receiver 126 receives signals via antenna 128. The output of receiver 126 is applied to microcomputer decoder 124 via low pass filter 130 and data limiter 132. Low pass filter 130 communicates with receiver control logic 134 which is in turn controlled by microcomputer 124. As can be seen, microcomputer decoder 124 also communicates with code plug address and option memory 136, output annunciator 138 and the user via user controls.

Specifically, the decoder is programmed to search for a signal from the satellite and then to synchronize its decoding operations to the timing of the motion of the beam. To synchronize to the signalling waveform, the decoder first remains on unit it decodes the down link signal. It then synchronizes its decoding operation with the received signal using well-known synchronization techniques that include establishing bit synchronization and frame synchronization with the received signal. The bit synchronization process includes adjusting the bandwith of the low pass filter 130 to match the bit rate of the received signal. Having done this, the receiver then synchronizes the operation of its own battery saving circuits with the predetermined timing of the down link transmission of the satellite using information that can be contained in either the program ROM of the microcomputer decoder 124 or in the code plug and option memory 136. As a result, the receiver battery saver only activates the pager during the intervals when the satellite is transmitting to the geographic area in which the pager resides. For example, FIG. 7A again shows preamble 62 followed by a synchronization code 63 which is in turn followed by an area identification portion 65. The area identification portion 65 and an address number 2 130 form what is referred to as group 1. Each subsequent group contains first and second addresses as is shown in FIG. 7A. Sync code 63 is repeated after the eighth group. Thus, if the receiver is programmed to respond to the group 4 addresses, the battery saver circuits in the receiver will only activate the pager during its search operation 132 during which time the receiver will search for preamble 62 and synchronization code 63, during time interval 134 when the group 4 addresses are being transmitted, and then again during each synchronization code interval 136. This is shown in FIG. 7B.

FIGS. 8A and 8B are flow charts which describe the operation of the receiver. After initialization, the receiver is turned on (140) and searches for the bit synchronization (142) for a predetermined search period (144) after which the receiver is turned off (145). If bit synchronization is achieved prior to termination of this predetermined search period (146), the receiver will begin its search for the synchronization code (148). Again, assuming the synchronization code is detected (150) prior to the expiration of a predetermined search period (152), the location code will be decoded (154) and the battery saver timing circuitry synchronized (156). The receiver will then begin searching for an address signal (158). Should an address signal be detected (160), an alert signal will be generated (162). If an address signal is not detected (160), the receiver will continue to search for an address signal until the battery saver timing circuits indicate that it is time to battery save (164). If an end of batch has not been detected (166), the timer will be set to wait for the next frame (168). If an end of batch has been detected, a timer will reset to wait for the next batch (170). In either case, the receiver will be turned on (172) after an appropriate time (174).

After initialization, the receiver is turned on and tries to establish synchronization for a predetermined search period. The search for bit synchronization includes a search for data at the various bit rates used in the system. If bit synchronization is achieved prior to termination of this predetermined search period, the receiver will begin its search for the synchronization code. Again, assuming the synchronization code is detected prior to the expiration of a predetermined search period, the location code will be decoded and the battery saver timing circuitry synchronized. The receiver will then begin searching for an address signal. Should an address signal be detected, an alert signal will be generated. If an address signal is not detected, the receiver will continue to search for an address signal until the battery saver timing circuits indicate that it is time to battery save. If an end of the batch has not been detected, the timer will be set to wait for the next frame. If an end of batch has been, detected, a timer will reset to wait for the next batch. In either case, the receiver will be turned on at the appropriate time.

Thus, it will be appreciated that the claimed invention can provide practical in-building paging coverage over a very wide area.

It will be appreciated that the claimed invention could be used to provide true nationwide or continent-wide paging coverage. In addition, it could also be used in conjunction with existing land-based paging systems to provide for true nationwide coverage when a paging subscriber leaves his usual geographical location.

What is claimed is:

1. A satellite signalling system comprising:
    a satellite;
    an antenna coupled to said satellite for providing a signal beam having a variable beam area, wherein said signal beam provided by said antenna comprises a data signal having a variable data rate; and
    control means coupled to said antenna for providing information to said antenna to define said signal beam to be one of a plurality of predetermined beam areas and to define said data signal to have one of a plurality of predetermined data rates, said control means determining said one of said plurality of predetermined data rates in response to said one of said plurality of predetermined beam areas.

2. The satellite signalling system according to claim 1 whereby said control means further directs said antenna to provide said signal beam sequentially to a plurality of predetermined locations on earth, said control means for defining said signal beam area and said data signal in response to said one of said plurality of predetermined locations.

3. A satellite signalling system according to claim 2 wherein when said control means directs said antenna to provide said signal beam at one of said plurality of predetermined locations having a dense population, said control means defines the signal beam and the data signal to one of said plurality of predetermined beam areas that is a small beam area and one of said plurality of predetermined data rates that is a high data rate, respectively.

4. A satellite signalling system according to claim 2 wherein when said control means directs said antenna to provide said signal beam at one of said plurality of predetermined locations having a sparse population, said control means defines the signal beam and the data signal to one of said plurality of predetermined beam areas that is a large beam area and one of said plurality of predetermined data rates that is a low data rate, respectively.

5. A satellite signalling system according to claim 2 wherein said data signal comprises a plurality of signal batches arranged in a predetermined sequence, each one of said plurality of batches corresponding respectively to one of said plurality of predetermined locations and having an identification code identifying the one of said plurality of predetermined locations and a corresponding predetermined transmission time,
    said satellite signalling system further comprising transmission means coupled to said antenna for transmitting said data signal, said transmission means further coupled to said control means such that when said control means directs said antenna to provide said signal beam to one of said plurality of predetermined locations, said transmission means is directed by said control means to transmit said one of said plurality of batches corresponding to said one of said plurality of predetermined locations for said corresponding predetermined transmission time.

6. A satellite signalling system according to claim 5 further comprising a portable selective signal receiver located within one of said plurality of predetermined locations, said portable selective signal receiver comprising receiving means selectively activated for the corresponding predetermined transmission time to receive only the one of said plurality of batches corresponding to said one of said plurality of predetermined locations.

7. A satellite signalling system according to claim 5 further comprising a portable selective signal receiver for receiving and decoding said data signal,
    wherein said portable selective signal receiver can synchronize to said one of said plurality of batches corresponding to said one of said plurality of predetermined locations in response to decoding said location identification code.

8. A satellite signalling system comprising:
    an antenna having a steerable beam;

a first receiver for receiving communication information and control information;

control means coupled to said antenna and said first receiver for controlling said antenna to sequentially direct said steerable beam to a plurality of predetermined locations in response to said control information and to vary said steerable beam's beam area corresponding to said plurality of predetermined locations in response to said control information;

a first transmitter coupled to said antenna and said control means for transmitting paging signals, wherein said paging signals comprise a data signal comprising said communication information and having a plurality of signal batches arranged in a predetermined sequence, each of said plurality of signal batches transmitted at one of a plurality of predetermined data rates, each of said plurality of batches corresponding to one of said plurality of predetermined locations and each of said plurality of batches having an identification code for identifying said corresponding one of said plurality of predetermined locations, wherein aid one of said plurality of predetermined data rates is determined by said control means in response to said beam area; and at least one selective call receiver located in one of said plurality of predetermined locations for receiving said paging signals, wherein said at least one selective call receiver in said one of said plurality of predetermined locations responds only to the one of said plurality of batches corresponding to said one of said plurality of predetermined locations in response to said identification code.

9. A system according to claim 8 further comprising a second transmitter for transmitting said communication and control information to said first receiver.

10. A method for paging comprising the steps of:

transmitting paging information and control information to a satellite receiver;

steering a beam of an antenna coupled to the satellite sequentially to a plurality of predetermined locations in response to said control information;

varying the area of said beam in accordance with said plurality of predetermined locations; and transmitting paging signals from said satellite to paging receivers in at least one of said plurality of predetermined locations at predetermined times corresponding to said one of said plurality of predetermined locations and at data rates corresponding to the area of said beam, said paging signals derived from said paging information.

11. A method according to claim 10 wherein said step of transmitting paging information and control information comprises transmitting control information and a plurality of signal batches arranged in a predetermined sequence, each of the plurality of signal batches corresponding to one of said plurality of predetermined locations and each of the plurality of signal batches having a predetermined transmission time associated therewith.

12. A satellite paging system comprising:

a satellite;

first means for transmitting paging information to said satellite;

at least one pager receiver; and second means for transmitting paging signals having a variable data rate from said satellite to a plurality of predetermined locations in a predetermined sequence, said at least one pager receiver residing in one of said plurality of predetermined locations, said second means including:

a movable antenna for providing a signal beam having a variable beam area; and control means for positioning said antenna to direct said signal beam to said plurality of predetermined locations in said predetermined sequence and for varying said beam area and said data rate in accordance with aid predetermined sequence.

* * * * *

UNITED STATES PATENT AND TRADEMARK OFFICE
CERTIFICATE OF CORRECTION

PATENT NO. : 5,121,503

DATED : June 9, 1992

INVENTOR(S) : Walter L. Davis

It is certified that error appears in the above-identified patent and that said Letters Patent is hereby corrected as shown below:

Column 9, line 25, delete "aid" and insert --said--.

Column 10, line 40, delete "aid" and insert --said--.

Signed and Sealed this

Seventh Day of September, 1993

*Attest:*

BRUCE LEHMAN

*Attesting Officer*     *Commissioner of Patents and Trademarks*